Sept. 29, 1925.

D. W. McNEIL 1,555,134

WASTE PIPE CONNECTION

Filed Nov. 26, 1920     2 Sheets-Sheet 1

Inventor
Daniel W. McNeil
Walter F. Murray
Attorney

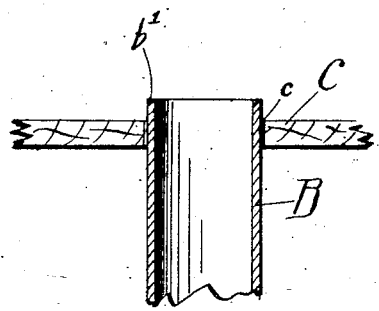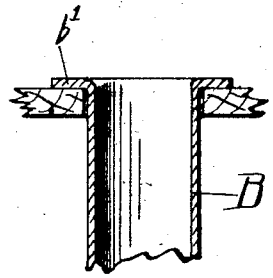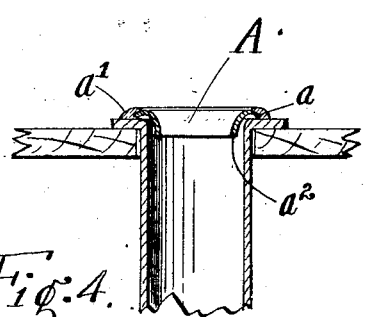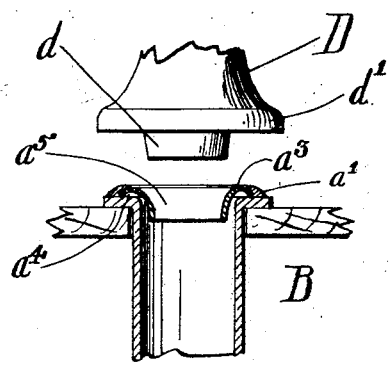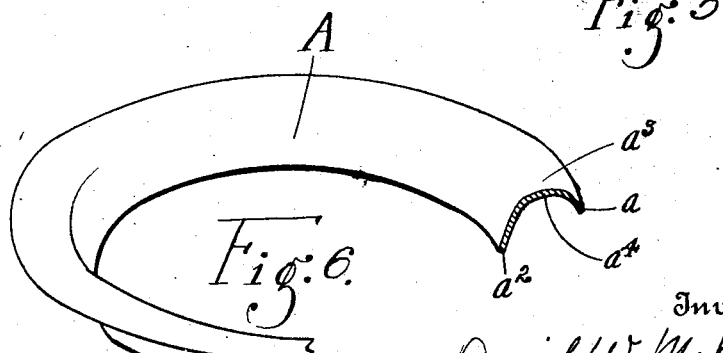

Patented Sept. 29, 1925.

1,555,134

UNITED STATES PATENT OFFICE.

DANIEL W. McNEIL, OF NORWOOD, OHIO, ASSIGNOR TO THE JOHN DOUGLAS COMPANY, OF CINCINNATI, OHIO, A CORPORATION OF OHIO.

WASTE-PIPE CONNECTION.

Application filed November 26, 1920. Serial No. 426,456.

*To all whom it may concern:*

Be it known that I, DANIEL W. MCNEIL, a citizen of the United States of America, and resident of Norwood, in the county of Hamilton and State of Ohio, have invented a new and useful Improvement in a Waste-Pipe Connection, of which the following is a specification.

An object of my invention is to provide means whereby a positive metal to china connection can be had for the mounting and connecting of fixtures such as flush bowls and the like with a waste pipe.

Another object is to provide a means for the purpose stated that is readily adapted to any method of waste pipe connection.

Another object is to provide a connection of the type referred to that will comply with the most stringent regulations of the various health bureaus.

Another object is to provide means that will permit ready installation of a flush bowl regardless of unevenness of the floors adjacent such connection.

These and other objects are attained by the means described herein and disclosed in the accompanying drawing, in which:—

Figs. 2, 3, 4 and 5 are sectional views illustrating the various steps for the making of a connection wherein a device embodying my invention is employed.

Fig. 6 is a perspective view of a ferrule forming a detail of my invention.

My invention comprises a ring or ferrule A, made of expansible material preferably such as copper, the outer edge $a$ of which is adapted to be secured upon a waste pipe by any suitable means such as solder $a'$. The ferrule or ring tapers from its inner edge $a^2$, and has its outer edge $a$ flared in such manner as to form a shoulder $a^3$ between the said inner and outer ends. By forming the shoulder and by flaring the outer edge $a$, a groove or gutter $a^4$ is formed between the outer edge $a$ and the body $a^5$ of the ferrule. The outer flared edge $a$ is soldered to a flange $b$ formed on the waste pipe B, and the inner edge $a^2$ of the ferrule, extends into the waste pipe B.

In Figs. 2, 3, 4, 5 and 6 a waste pipe B, made of lead, is shown. In this type of construction it is the practice to project the waste pipe B above a floor C, thru a perforation $c$ in such floor, and that portion $b'$ of the waste pipe B extending above floor C is turned over in a manner that is common in the art. Heretofore it has been the practice to lay a ring of putty upon the over-turned sections $b'$ of the waste pipe, and then the flush bowl D was placed over the putty and the horn or discharge flange $d$ of the flush bowl projected into the waste pipe B. The base $d'$ of the flush bowl was then secured to the floor by means of the bolts, screws, etc. This sort of a construction is unsanitary and although it is still used extensively, various regulations have been and are being passed from time to time forbidding any further installations of this type. The reason for this is that the putty deteriorates and breaks away from between the waste pipe and the flush bowl, consequently odors and gases escape thru the defective connection.

In connections made up to this time, wherein pipe E, the upper end $e$ of which is threaded and engages the sleeve $b$ adapted to lie upon the floor C and to be attached thereto is employed, it is general practice to mount a series of felt or composition gaskets upon flange $b$ and to draw the flush bowl D tightly upon the gaskets and flange $b$ by means of bolts F. Such gaskets make it practically impossible to secure a connection in which the base $b'$ of the flush bowl would seat firmly upon the floor C. Every installation presents a different situation and requires different size gaskets, and therefore in these various installations, spaces of various sizes resulted between the base $d'$ and the floor C. Deterioration of the gaskets results in conditions similar to the deterioration of the putty before referred to.

Figure 1:
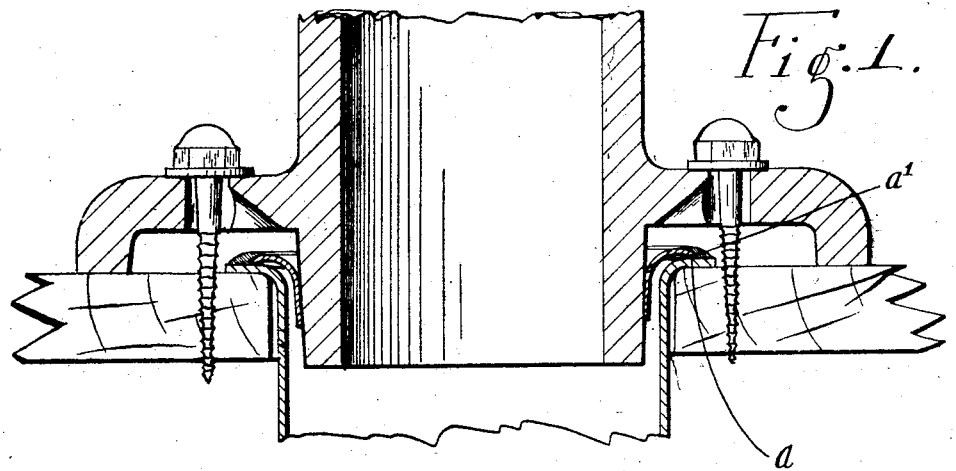
Fig. 1 is an enlarged sectional view of a completed connection embodying my invention.
Figure 7:
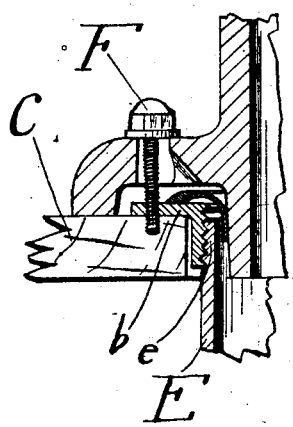
Figs. 7, 8 and 9 are sectional views showing various connections and the application therein of a device embodying my invention.
Figure 8:
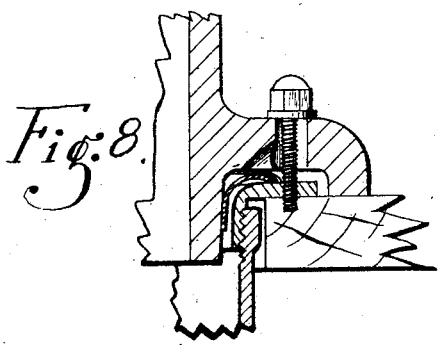
Figure 9:
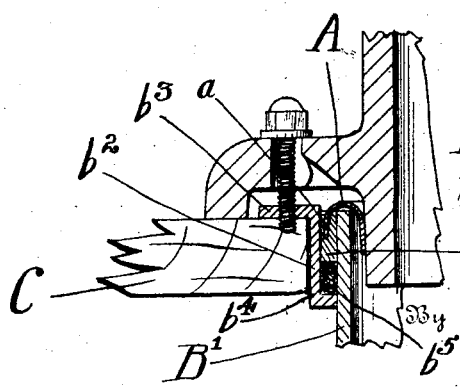

In the device submitted by the applicant the outer edge $a$ of the ferrule is fixedly mounted upon the lead pipe, or upon the flange $b$. The flange $b$ is used in connection with the threaded iron pipes E or with a cast iron pipe as shown in Fig. 9 by being soldered thereto. This makes a solid joint. The flange $d$ formed on the flush bowl preferably and generally tapers downward and inward and is therefore of a smaller diameter at its lower end. This lower end of the flange $d$ is slightly in excess of the smallest or inside diameter of the ferrule, such smallest diameter being at the edge $a^2$. A lubricant such as white lead or red lead paste is placed upon flange $d$ when the flush bowl is mounted over the waste pipe D. The flush bowl is then mounted upon the floor by means of screws or bolts F. As the flush bowl is drawn upon the floor the lowermost part of the flange $d$ is forced thru the expansible ferrule and the lowermost end of the flange $d$ is projected into the waste pipe below the inner edges $a^2$ of the ferrule. The ferrule binds upon the flange $d$ and makes a positive metal to china connection, flush bowls being made generally of china.

When a cast iron pipe B' is used as shown in Fig. 9 it is customary to provide a sleeve $b^2$ into which the cast iron pipe extends. The sleeve $b^2$ has a flange $b^3$ that lies upon the floor C. A pocket $b^4$ is formed between the sleeve $b^2$ and the pipe B', and into this pocket is generally packed oakum $b^5$ and upon the oakum is poured molten lead $b^6$. At the time the lead is poured, the ferrule A is mounted above the pipe B' and the outer edge $a$ of the ferrule extends into the pocket $b^4$, wherefore, when the lead has been poured and has solidified the ferrule is fixedly secured upon the pipe B'.

What I claim is:—

1. The combination of a waste pipe, a sheet metal ferrule adapted to be fixedly mounted upon the waste pipe and a fixture having a discharge flange adapted to engage and be projected thru the ferrule into the waste pipe.

2. The combination of a waste pipe, a sheet metal ferrule adapted to be fixedly mounted upon the waste pipe and to project into the waste pipe, a fixture and a discharge flange on the fixture adapted to engage the ferrule and be projected therethru.

3. The combination of a waste pipe, a flange on the waste pipe, an expansible sheet metal ferrule mounted on the flange and extending into the waste pipe, a fixture and a discharge flange on the fixture adapted to engage the ferrule and to project therethru into the waste pipe.

4. The combination of a waste pipe, a sheet metal ferrule adapted to be fixedly mounted on the waste pipe and to project into the waste pipe, a fixture, and a discharge flange on the fixture, the flange flaring outwardly as it approaches the fixture, and the smaller end of the flange being of a diameter substantially equal to that of the smallest diameter of the ferrule, the flange being adapted to be projected thru the ferrule into the waste pipe.

5. The combination of a waste pipe, an expansible sheet metal ferrule having a tapered body, an outwardly flared edge on the larger end of the body and a contracted edge on the other end of the body, the flared edge being adapted to be fixedly mounted on the waste pipe, and the contracted edge being adapted to extend into the waste pipe, a fixture, and a discharge flange on the fixture adapted to engage the contracted end of the ferrule and to be projected therethru into the waste pipe.

6. The combination of a waste pipe, an expansible sheet metal ferrule having a tapered body, an outwardly flared edge on the larger end of the body, a contracted edge on the other end of the body, and a shoulder between the said edges, the flared edge being adapted to be fixedly mounted on the waste pipe, and the contracted edge being adapted to extend into the waste pipe, a fixture, and a discharge flange on the fixture adapted to engage the contracted end of the ferrule and to be projected therethru into the waste pipe.

7. The combination of a waste pipe, an expansible sheet metal ferrule having a tapered body, an outwardly flared edge on the larger end of the body, a contracted edge on the other end of the body, and a shoulder between the said edges, the flared edge being adapted to be fixedly mounted on the waste pipe, and the contracted edge being adapted to extend into the waste pipe, a fixture, and a tapered flange having its smaller end spaced from the fixture proper and such smaller end being of a diameter substantially equal to that of the contracted edge of the ferrule, the flange being adapted to engage the ferrule and to have its smaller end projected thru the ferrule into the waste pipe.

8. The combination of a pipe, a resilient sheet metal ring, having two edges of dissimilar diameters, the edge formed at the larger diameter of the ring having a fixed mounting upon the pipe and a fixture engaging the edge of the ring formed at the smaller diameter and projecting through the opening at the last mentioned edge of the ring.

9. The combination of a pipe, a sheet metal ferrule having a central opening and having inner and outer edges of dissimilar diameters, the inner edge defining the opening through the ferrule, the outer edge of the ferrule fixedly mounted upon the pipe and a fixture having a depending flange, said flange having a smooth external face converging downwardly extending through the opening in the ring and engaging the inner edge of the ring.

In testimony whereof, I have hereunto subscribed my name this 22nd day of November, 1920.

DANIEL W. McNEIL.